(No Model.)

D. LEWIS.
PLOW.

No. 370,069. Patented Sept. 20, 1887.

Witnesses
Thos. Houghton.
Katie Parkhurst.

Inventor
Dio Lewis

By his Attorney
John S. Duffie

UNITED STATES PATENT OFFICE.

DIO LEWIS, OF PRESCOTT, ARKANSAS.

PLOW.

SPECIFICATION forming part of Letters Patent No. 370,069, dated September 20, 1887.

Application filed July 5, 1887. Serial No. 243,390. (No model.)

*To all whom it may concern:*

Be it known that I, DIO LEWIS, a citizen of the United States, residing at Prescott, in the county of Nevada and State of Arkansas, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to plow-beams; and it consists in the novel construction and arrangement of its parts, and particularly to the catch-lever, quadrant-brace, and lever-rod, which are so constructed that the beam can be adjusted in such a manner as to enable the plow to run close to the plants or furrows while the horse may be walking in an angular direction, keeping off the row, and so that the plow may avoid stumps or obstacles without changing the direction of the horse, and so that at the terminus of a row, instead of lifting the plow out of the ground, I can release the beam from the quadrant-brace by means of the rod attached to the short lever, which is so constructed as to free the beam by a gentle pull of the rod, and when the horse has taken position for the next row I can easily run the plow close to the fence and then bring it in position again without any inconvenience. The catch-lever is constructed top-heavy, so as to drop in the slots in the quadrant-brace when the beam is brought in the proper position. There may be as many slots cut in the brace as may be deemed necessary. The stock may be arranged to use all kinds of plows.

Figure 1:
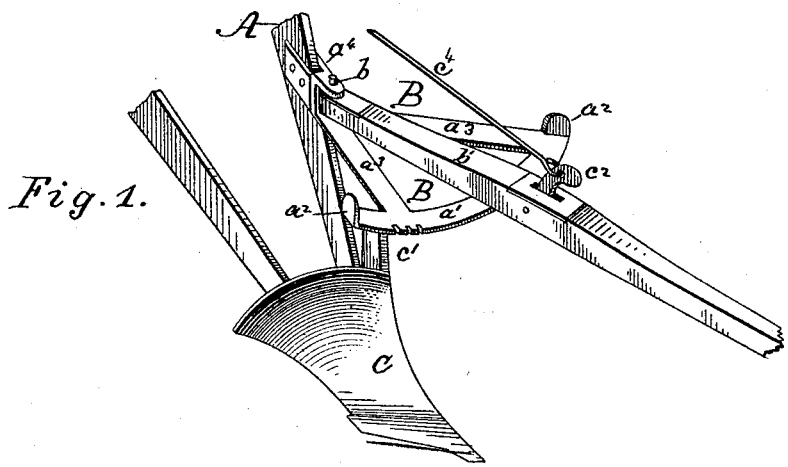
Figure 2:
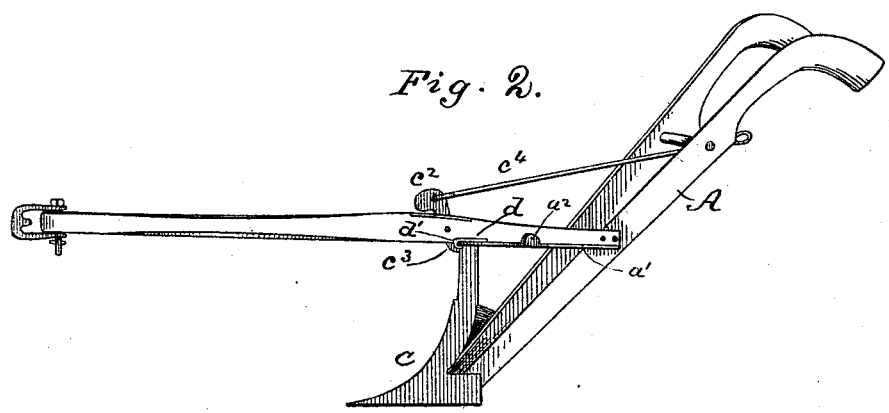
Figure 3:
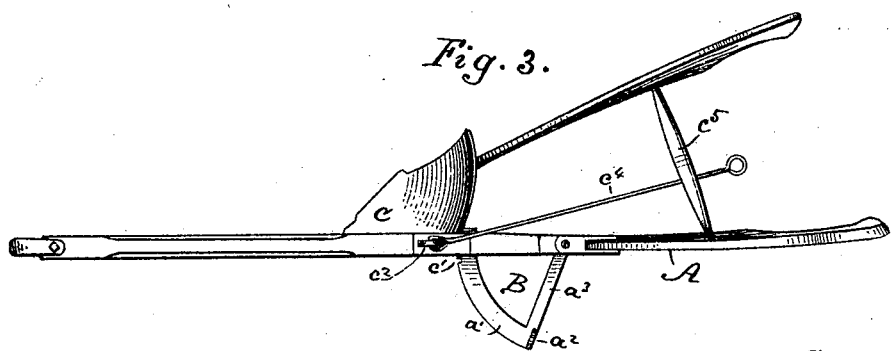

In the accompanying drawings, Figure 1 is a perspective view of my invention. Fig. 2 is a side view of the same. Fig. 3 is a top plan view of the same.

My invention is described as follows: To the plow-beam A, I securely attach, by bolts or otherwise, a brace, B, the front end of which terminates in the circular bar $a'$, having a stop, $a^2$, on either end. Said circular bar is supported by two braces, $a^3$, which are attached to the said bar or cast with the same, and run back to and are attached to a socket, $a^4$, by means of which the said braces are securely bolted to the said beam A. The said socket $a^4$ is provided with a swivel-socket, $b$, on its front side for the rear end of the plow-beam $b'$ to be swiveled in, which is done by means of a bolt or by other suitable contrivance. The circular bar $a'$ has in its front edge, and on a direct line with the plow-beam A and plow-point C, a number of notches, $c'$. The plow-beam is provided with a lever, $c^2$, which is pivoted perpendicularly in said beam, and is so adjusted that its lower end, $c^3$, will catch in the notches $c'$. The said lever is made top-heavy, and so constructed that when let loose its upper end will fall of its own weight and throw its lower end into the said notches $c'$. This lever is provided with a rod, $c^4$, the front end of which rod is attached to the upper end of said lever, while the other end works through a staple in the rod $c^5$ between the handles of the plow, and is in easy reach of the plowman. The said plow-beam is provided with a plate, D, which is secured to the lower face of said beam, its front end, $d'$, being turned back under the said circular brace $a'$ and made to hold the same in position, allowing it, however, to work back and forth. The said brace D has in it a slot, through which the lower end of the lever $c^2$ may pass and enter the said notches $c'$. The said brace C has on either end stops $a^2$, which prevent the plow-beam $b'$ from running off either end of the said brace.

Having described my invention, what I claim as new, and desire to secure by Letters Patent, is—

1. In combination with the plow, the brace B, secured to the plow-beam A, consisting of the socket $a^4$, arms $a^3$, circular brace $a'$, having the stops $a^2$ and notches $c'$, the beam $b'$, pivoted in the swivel-socket $b$ and provided with the top-heavy lever $c^2$, pivoted perpendicularly in said beam and adjusted so that its lower end, $c^3$, will catch in the notches $c'$, and rod $c^4$, its front end attached to the upper end of said lever $c^2$, its rear end working through a staple in the rod $c^5$, substantially as shown and described, and for the purposes set forth.

2. In combination with the plow, the brace B, secured to the plow-beam A, consisting of the socket $a^4$, arms $a^3$, circular brace $a'$, having the stops $a^2$ and notches $c'$, the beam $b'$, pivoted in the swivel-socket $b$ and provided with the top-heavy lever $c^2$, pivoted perpendicularly in said beam and adjusted so that its lower end, $c^3$, will catch in the notches $c'$, rod $c^4$, its front end attached to the upper end of said lever $c^2$, its rear end working through a staple in the rod $c^5$, and slotted plate D, secured to the lower face of said beam, its front end turning back and grasping said circular brace $a'$, substantially as shown and described, and for the purposes set forth.

In testimony whereof I affix my signature in presence of two witnesses.

DIO LEWIS.

Witnesses:
JOHN WALLER ADAMS,
SAMUEL THOMAS WHITE.